United States Patent
Estrada et al.

(10) Patent No.: US 11,961,172 B1
(45) Date of Patent: Apr. 16, 2024

(54) ADVANCED IMAGE ENHANCEMENTS FOR ACCURATE PROCESSING, EXPLOITATION, AND DISSEMINATION

(71) Applicant: Royce Geospatial Consultants, Inc., Arlington, VA (US)

(72) Inventors: Adam Estrada, Reston, VA (US); Andrew Ryan, Baltimore, MD (US); Casey Backes, O'Fallon, IL (US); Joseph Bader, Highlands Ranch, CO (US); Kenneth Joyce, Denver, CO (US); Jason Dodge, Reston, VA (US); Dave Rabrun, Rockville, MD (US)

(73) Assignee: ROYCE GEOSPATIAL CONSULTANTS, INC., Arlington, VA (US)

( * ) Notice: Subject to any disclaimer, the term of this patent is extended or adjusted under 35 U.S.C. 154(b) by 0 days.

(21) Appl. No.: 18/488,958

(22) Filed: Oct. 17, 2023

(51) Int. Cl.
| | |
|---|---|
| G06T 11/60 | (2006.01) |
| G06T 3/4053 | (2024.01) |
| G06T 5/70 | (2024.01) |
| G06T 7/11 | (2017.01) |
| G06T 7/33 | (2017.01) |

(52) U.S. Cl.
CPC ............ *G06T 11/60* (2013.01); *G06T 3/4053* (2013.01); *G06T 5/70* (2024.01); *G06T 7/11* (2017.01); *G06T 7/33* (2017.01); *G06T 2207/10032* (2013.01); *G06T 2207/20081* (2013.01); *G06T 2207/20084* (2013.01)

(58) Field of Classification Search
CPC ......... G06T 11/60; G06T 3/4053; G06T 5/70; G06T 7/11; G06T 7/33; G06T 2207/10032; G06T 2207/20081; G06T 2207/20084
See application file for complete search history.

(56) References Cited

U.S. PATENT DOCUMENTS

| | | | | |
|---|---|---|---|---|
| 10,387,728 | B2 * | 8/2019 | Arya | G06N 5/04 |
| 11,544,832 | B2 * | 1/2023 | Lowe | G06N 3/045 |
| 11,694,354 | B2 | 7/2023 | Strong | |
| 2019/0050625 | A1 * | 2/2019 | Reinstein | G06V 10/235 |
| 2020/0125844 | A1 * | 4/2020 | She | G06V 10/764 |
| 2021/0012177 | A1 * | 1/2021 | Yang | G06V 10/25 |
| 2021/0295546 | A1 | 9/2021 | He et al. | |
| 2021/0312632 | A1 * | 10/2021 | Ma | G06V 10/267 |
| 2021/0319370 | A1 * | 10/2021 | Schneider | G06F 17/18 |
| 2023/0146181 | A1 | 5/2023 | Meshkin et al. | |
| 2024/0031846 | A1 * | 1/2024 | Mengwasser | G06N 20/00 |

* cited by examiner

*Primary Examiner* — Bobbak Safaipour

(74) *Attorney, Agent, or Firm* — Galvin Patent Law LLC; Brian R. Galvin

(57) ABSTRACT

A system and method for object monitoring, detection, and segmentation in electro-optical (EO) satellite imagery data comprising an image processing engine configured to prepare EO data for analysis by an inference engine which utilizes one or more trained models to perform object detection or image segmentation. The workflow begins with ingesting satellite data, followed by de-hazing to remove atmospheric interference. Image enhancement improves resolution and geo-registration ensures precise spatial alignment. The processed image is then fed into a machine learning-based object detection or image segmentation network, trained to identify specific objects of interest. This integrated approach leverages advanced technologies to extract actionable insights from satellite data, enabling efficient and precise object monitoring, detection, and segmentation.

20 Claims, 8 Drawing Sheets

ADVANCED IMAGE ENHANCEMENTS FOR ACCURATE PROCESSING, EXPLOITATION, AND DISSEMINATION

CROSS-REFERENCE TO RELATED APPLICATIONS

Priority is claimed in the application data sheet to the following patents or patent applications, each of which is expressly incorporated herein by reference in its entirety:
None

BACKGROUND OF THE INVENTION

Field of the Art

The present invention is in the field of object monitoring, and more particularly to detection, segmentation, and classification of objects using artificial intelligence.

Discussion of the State of the Art

Object monitoring and detection systems have witnessed significant advancements, mainly propelled by the rapid development of computer vision and deep learning technologies. These advancements have led to highly accurate and efficient systems for detecting, segmenting, and monitoring objects or features in images and videos. Deep learning, especially Convolutional Neural Networks (CNNs), has played a pivotal role in revolutionizing object detection and image segmentation, resulting in state-of-the-art models like Faster R-CNN, single-shot detector, YOLO (you only look once), U-Net, and DeepLabV3. These models excel in terms of accuracy and speed, making them suitable for various applications, including autonomous vehicles, surveillance, and robotics.

One notable achievement in the field is the achievement of real-time object detection and image segmentation, allowing systems to process and recognize objects in real-world scenarios with minimal latency. Additionally, object detection and image segmentation systems exhibit robustness across a wide range of conditions, including variations in object scale, orientation, and occlusion. Transfer learning has further eased the development of object detectors and feature extractors, enabling the use of pre-trained models on large datasets to fine-tune them for specific tasks, even with limited labeled data.

Another significant development is the incorporation of object tracking algorithms into object monitoring systems. This addition allows systems to track objects over time, providing valuable temporal context and enhancing the understanding of object behavior.

Despite these advancements, object monitoring, detection, and feature extraction systems still face several drawbacks and limitations. One of the most significant challenges is the labor-intensive and costly process of gathering and annotating large datasets required for training accurate object detectors. Additionally, these systems may struggle in challenging real-world conditions, such as low-light environments, adverse weather, or when objects are partially occluded.

Complexity remains a concern, as many state-of-the-art models demand substantial computational resources. Deploying such models on resource-constrained devices can be a challenging task. False positives (identifying non-existent objects) and false negatives (missing objects) remain issues, particularly in safety-critical applications.

Furthermore, many advanced models lack an understanding of object semantics or context, limiting their use in higher-level reasoning tasks. Interpreting these models can be challenging due to their complexity and lack of transparency.

Complicating matters further, electro-optical (EO) imagery suffers from varying amounts of degradation due to environmental factors, such as haze, which reduces imagery contrast, introduces noise, and can further degrade geolocational accuracy. Degradation in imagery quality deteriorates both human and machine ability to interpret objects in the imagery and results in degraded performance of object detection and image segmentation algorithms.

What is needed is a system and method which utilizes artificial intelligence to conduct rapid broad area search, detection, and monitoring of mobile and fixed targets with precision, recall, and confidence.

SUMMARY OF THE INVENTION

Accordingly, the inventor has conceived and reduced to practice, a system and method for object monitoring, detection, and segmentation in electro-optical (EO) satellite imagery data comprising an image processing engine configured to prepare EO data for analysis by an inference engine which utilizes one or more trained models to perform object detection and image segmentation. The workflow begins with ingesting satellite data, followed by de-hazing to remove atmospheric interference. Image enhancement improves resolution and geo-registration ensures precise spatial alignment. The processed image is then fed into a machine learning-based object detection or segmentation network, trained to identify specific objects or features of interest. This integrated approach leverages advanced technologies to extract actionable insights from satellite data, enabling efficient and precise object monitoring, detection, and extraction.

According to a preferred embodiment, an object monitoring, detection, and segmentation platform is disclosed, comprising: a computing device comprising a memory and a processor; a machine learning algorithm configured to perform object detection or image segmentation on an input in order to generate as output an enhanced image; an image processing engine comprising a first plurality of programming instructions stored in the memory which, when operating on the processor, causes the computing device to: receive satellite imagery data; produce analysis ready data (ARD) by: performing image dehazing on the satellite imagery data; performing resolution enhancement on the satellite imagery data; and performing geospatial alignment on the satellite imagery data; and an inference engine comprising a second plurality of programming instructions stored in the memory which, when operating on the processor, causes the computing device to: use the ARD as an input to the machine learning algorithm to produce an enhanced image associated with the satellite imagery data.

According to another preferred embodiment, a method for object monitoring, detection, and segmentation is disclosed, comprising the steps of: training a machine learning algorithm configured to perform object detection or image segmentation on an input in order to generate as output an enhanced image; receiving satellite imagery data; producing analysis ready data (ARD) by: performing image dehazing on the satellite imagery data; performing resolution enhancement on the satellite imagery data; and performing geospatial alignment on the satellite imagery data; and using the ARD as an input to the machine learning algorithm to produce an enhanced image associated with the satellite imagery data.

According to an aspect of an embodiment, the satellite imagery data comprises mid-resolution images.

According to an aspect of an embodiment, the satellite imagery is electro-optical imagery.

According to an aspect of an embodiment, the image dehazing is performed using a dehazing model.

According to an aspect of an embodiment, the dehazing model is developed using a generative adversarial network.

According to an aspect of an embodiment, the resolution enhancement is performed using a super-resolution technique.

According to an aspect of an embodiment, the machine learning algorithm is a computer vision algorithm.

According to an aspect of an embodiment, the machine learning algorithm is a convolutional neural network.

According to an aspect of an embodiment, the enhanced image comprises one or more bounding boxes and one or more class labels.

According to an aspect of an embodiment, the satellite imagery data comprises high-resolution images.

BRIEF DESCRIPTION OF THE DRAWING FIGURES

DETAILED DESCRIPTION OF THE INVENTION

Figure 1:
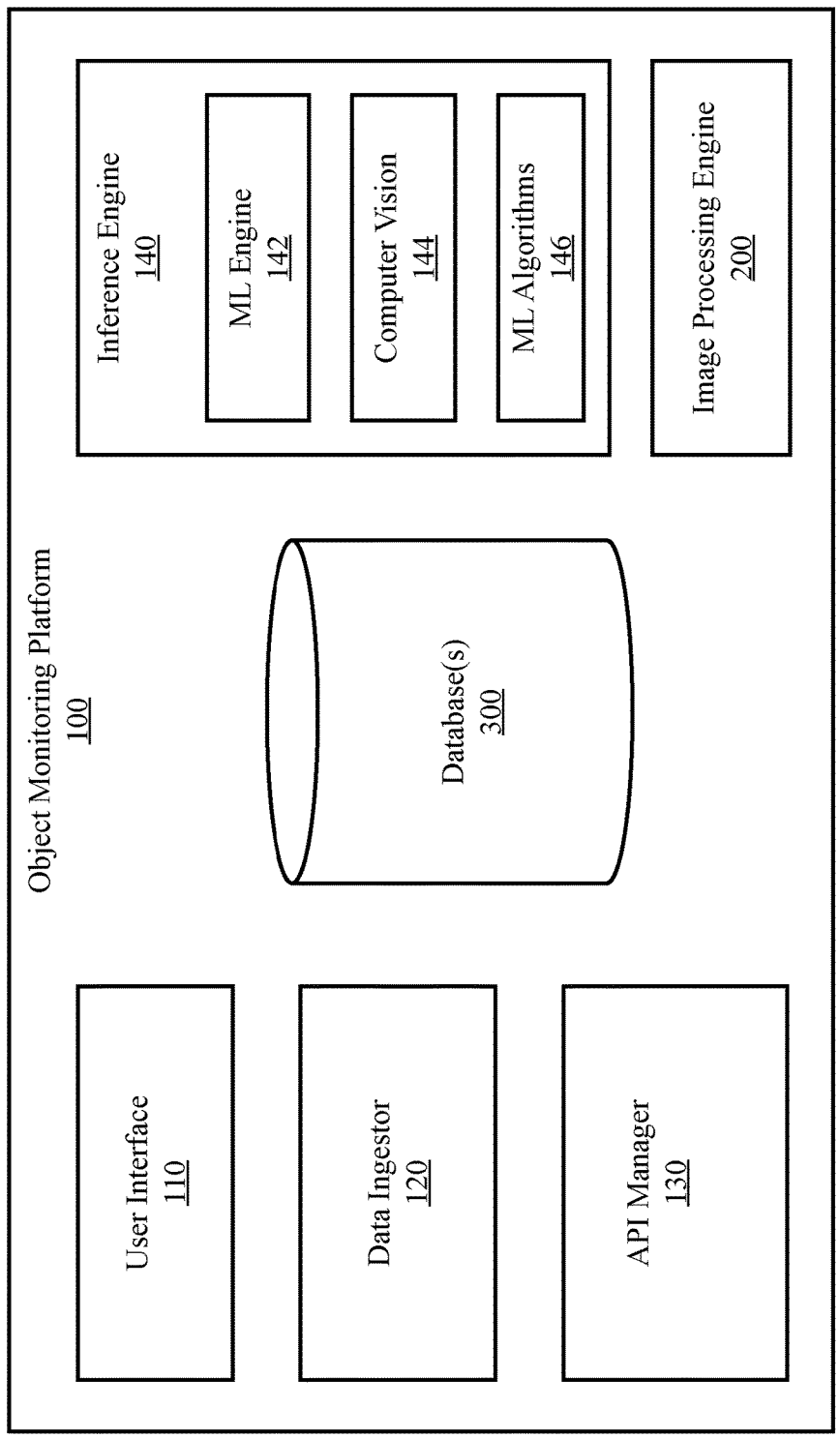
FIG. 1 is a block diagram illustrating an exemplary system architecture for an object monitoring platform, according to an embodiment.

The inventor has conceived, and reduced to practice, a system and method for object monitoring, detection, and segmentation in electro-optical (EO) satellite imagery data comprising an image processing engine configured to prepare EO data for analysis by an inference engine which utilizes one or more trained models to perform object detection and image segmentation.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Electro-optical imagery data" or "EO imagery data" as used herein refers to visual information about the Earth's surface and atmosphere that is collected using sensors sensitive to electromagnetic radiation within the optical spectrum, which includes visible light and near-infrared wavelengths. EO imagery is captured by satellites, aircraft, drones, or other platforms equipped with optical sensors. It is a subset of remote sensing data and is widely used for a variety of applications.

"Image dehazing" or "dehazing" as used herein means a computer vision and image processing technique used to remove or reduce the effects of haze, fog, or smog from images. Haze in images can significantly degrade visibility and image quality, making it difficult to discern details and colors. Dehazing algorithms aim to enhance the clarity and visibility of objects in such images.

"Georegistration", short for "geometric registration" or "geospatial registration," as used herein refers to the process of aligning or matching an image to a specific geographic location on the Earth's surface. This is a critical step in geospatial analysis and is used to ensure that remote sensing or aerial imagery accurately represents the real-world locations it depicts.

Conceptual Architecture

FIG. 1 is a block diagram illustrating an exemplary system architecture for an object monitoring platform, according to an embodiment. According to the embodiment, object monitoring platform 100 can provide object monitoring, detection, segmentation, and classification utilizing one or more artificial intelligence models configured to provide various image processing tasks and output an enhanced image. The utilization of these one or more AI models improves both the quality of the output image and the speed at which such image processing can be achieved. In various implementations, platform 100 provides a sophisticated image processing workflow that combines high-resolution and mid-resolution imagery to improve the quality of images and enhance object detection and feature extraction leveraging machine learning techniques.

According to an embodiment, object monitoring platform 100 and its various components may be arranged on a singular computing device comprising at least a processor and memory, and may also comprise a non-volatile data storage device. The computing device may comprise one or more processors. Exemplary computing devices can include, but are not limited to, desktop computers, laptops, tablets, servers, and/or the like. In other implementations, object monitoring platform 100 and its various components may be arranged in a distributed architecture, wherein a plurality of computing devices may be used to execute the processes and capabilities of the components described herein. For example, object monitoring platform 100 may be a cloud-based platform which utilizes one or more servers for executing the functions of the components described herein. In some implementations, object monitoring platform 100 may be offered as a service or software-as-a-service implementation, wherein each of the components described herein may be designed as a service or micro-service which interfaces an object monitoring platform 100 service. It should be appreciated that the illustrated embodiment represents only one possible arrangement of a plurality of arrangements which may be utilized, dependent upon the requirements and/or constraints of the given implementation. It should be further appreciated that the illustrated components present in this embodiment are exemplary; other embodiments of object monitoring platform 100 may comprise more or fewer components than what is described herein.

According to the embodiment, object monitoring platform 100 comprises a user interface (UI) 110, a data ingestor 120, an application programming interface (API) manager 130, an inference engine 140, an image processing engine 200, and one or more databases 300. According to some embodiments, data ingestor 120 may be configured to receive, retrieve, or otherwise obtain data from a plurality of information sources. In some implementations, the plurality of information sources can include one or more satellites. Data ingestor 120 may be a software tool or system responsible for collecting, importing, and processing data from various sources into a target data storage (e.g., database 300) or processing system (e.g., inference engine 140, image processing engine 200). Its primary purpose is to facilitate movement of data from source systems to destination systems, making the data available for further analysis, processing, and storage.

Data ingestor 120 can collect data from diverse sources, which can include (but are not limited to) databases, files, APIs, logs, data streams, sensors, and more. These sources may provide structure, semi-structured, or unstructured data. Ingested data may need to be transformed or normalized into a consistent format or structure to ensure compatibility with the destination system. This can involve tasks such as data type conversion, data cleansing, and data enrichment. Prior to moving the data into the target system, data ingestor 120 may perform validation checks to ensure the data's integrity and quality. This can involve checking for missing values, duplicates, or data that doesn't conform to predefined rules. In some cases, data needs to be routed to different destination systems or databases based on specific criteria. Data ingestor 120 may make decisions on where to route data based on predefined rules or conditions. In some implementations, data ingestor 120 may be configured to operate with streaming data sources, processing data as it arrives and ensuring timely delivery to downstream systems. In some implementations, data ingestor 120 may be configured to handle batch data ingestion, wherein data is collected over a certain period and processed as a batch before being loaded into the target system. Data ingestor 120 can be designed to scale and handle large data loads efficiently without impacting platform 100 performance.

In some embodiments, data ingestor 120 might enforce authentication and authorization mechanisms to ensure that only authorized personnel and systems can access and ingest data. Additionally, data ingestor 120 may be further configured to provide monitoring and reporting capabilities to track the status of data ingestion processes, identify bottlenecks, and ensure that data is flowing smoothly. In such implementations, data ingestion monitoring and reporting may be displayed via user interface 110.

Also present in the embodiment is API manager 130 configured to assist in the creation, publishing, management, and security of various APIs. APIs enable different software systems to communicate and interact with each other, and API manager 130 can function as a central system to streamline the entire API lifecycle. In some implementations, API manager 130 is configured to obtain data from one or more third-party data sources. In an embodiment, the third-party data may comprise satellite imagery data. In an embodiment, the satellite imagery data is electro-optical (EO) imagery. In an embodiment, the satellite imagery data comprises mid- and/or high-resolution electro-optical imagery. API manager 130 and/or data ingestor 120 may be configured to acquire mid-resolution images daily (or some other defined collection schedule). One exemplary data source which may provide mid- and/or high-resolution imagery data is Planet, Inc., which can provide a large database of real-time, continuous satellite imagery data from around the world. Data obtained by API manager 130 may be sent to data ingestor 120 where it may be processed and then forwarded to the appropriate system. In some embodiments, data obtained by API manager 130 may be sent directly to either one of or both of inference engine 140 and image processing engine 200.

Object monitoring platform 100 may utilize an image processing engine 200 designed to manipulate and/or enhance digital images (i.e., satellite EO imagery) to produce analysis ready data (ARD). In an embodiment, ARD is data that is ready to be processed by object monitoring platform 100 components such as inference engine 140. Image processing engine 200 may be implemented as software or hardware or both, dependent upon the embodiment. A primary purpose of image processing engine 200 is to perform various operations on images to improve their quality, extract information, and/or prepare them for further analysis or presentation. In some embodiments, the image processing may comprise an image dehazing step. An image dehazing model may be developed, wherein an algorithm analyzes the input image to identify regions affected by haze. These regions may be characterized by a reduction in contrast, a loss of color saturation, and/or bluish or grayish tint. For a more detailed description of the image dehazing process, refer to FIG. 2.

In some embodiments, the image processing may comprise an enhancement step. Image enhancement may include, but is not limited to, brightness and contrast adjustment, histogram equalization, noise reduction, sharpening, color correction, contrast stretching, spatial filtering, gamma correction, histogram matching, multi-scale image enhancement, and/or the like. The goal of image enhancement is to reveal hidden details, enhance certain features, or correct imperfections in the image while maintaining authenticity. This can be done through various techniques and algorithms, and the choice of enhancement method depends on the embodiment. For a more detailed description of the image enhancement process, refer to FIG. 2.

An inference engine 140 is present and configured to receive, retrieve, or otherwise obtain imagery data and use computer vision (CV) 144 and AI/ML processes 146 to execute object inferences on imagery data. In some embodiments, the imagery data is satellite EO imagery data. In an embodiment, the satellite EO imagery data is associated with one or more target sites or locations. Inference engine 140 may obtain imagery data from database(s) 300, data ingestor 120, image processing engine 200, and/or API manager 130. In an embodiment, inference engine 140 receives ARD from image processing engine 200, the ARD comprising satellite EO imagery processed via one or more of image dehazing, image resolution enhancement, and/or georegistration. In an implementation, inference engine 140 produces a standardized data output along with the enhanced image. In an embodiment, the enhanced image comprises an image which has been processed by image processing engine 200 and which has been analyzed by inference engine 140. For example, in an embodiment, the enhanced image may comprise boxes around targets or objects of interest (i.e., automobiles, trains, aircraft, etc.) and an assigned target label for each such boxed target or object. In an implementation, inference engine 140 produces a standardized data output directly to an object-relational (i.e., PostGIS) database 300 along with the enhanced image. In some embodiments, the data is then extracted, transformed, and loaded into an appropriate format. All observations and images are immediately available for review through UI 110. In various implementations, inference engine 140 automates large-scale AI/ML-powered monitoring operations and can be configured for electro-optical commercial analytic services with connections to mid-resolution imagery repositories and high-resolution tasking interfaces.

Inference engine 140 may comprise a machine learning (ML) engine 142 configured to train, maintain, and deploy one or more machine and/or deep learning models to provide object monitoring, detection, and image segmentation capabilities. Machine learning engine 142 may receive, retrieve, or otherwise obtain a plurality of data which can be collected from various information sources including, but not limited to, satellite imagery data, data sourced from governmental and non-governmental organization databases, and "big data." For example, data from national space agencies (e.g., National Aeronautics and Space Administration, European Space Agency, etc.) and academic and educational institutions are a few such sources. Machine learning engine may use some or all the obtained data to develop one or more models for object monitoring, detection, and image segmentation. For a more detailed description of the machine learning engine 142, refer to FIG. 4.

Figure 2:
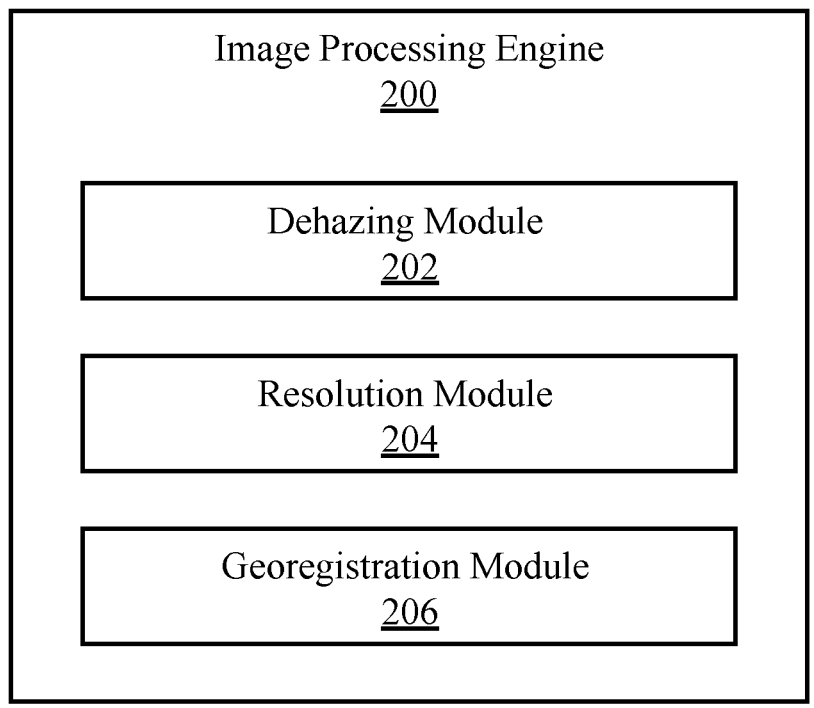
FIG. 2 is a block diagram illustrating an exemplary aspect of an object monitoring platform, an image processing engine.

FIG. 2 is a block diagram illustrating an exemplary aspect of an object monitoring platform 100, an image processing engine 200. Image processing engine 200 is configured to receive, retrieve, or otherwise obtain imagery data such as satellite EO imagery data. Image processing engine 200 may obtain data from database(s) 300, data ingestor 120, API manager 130, or some combination thereof. In an embodiment, image processing engine 200 obtains imagery data from a platform user via user interface 110, thereby allowing a user to input a target image and receive as output an enhanced image. In an embodiment, image processing engine 200 and/or its components receives mid-resolution satellite EO images as input.

According to the aspect, image processing engine 200 comprises one or more modules configured to provide various image processing capabilities. Applying these capabilities to enhance satellite imagery beyond native resolution increases overall quality of the image and allows the CV algorithms 144 to detect objects with higher confidence. For example, using super-resolution on acquired mid-resolution imagery data increases observation satellite resolution from 3-meter ground sampling distance (GSD) to better than 1.5-meter. This results in a roughly 50% increase in GSD under most conditions and under ideal sensor conditions can be increased further. Sharpened imagery is especially critical for meeting and exceeding precision and recall requirements for targets that approach the size of 10 or fewer pixels at native resolution as super-resolution delivers CV object detection and image segmentation algorithm gains of more than 30% mean Average Precision (mAP) over native resolution.

A dehazing module 202 is present and configured to perform image dehazing on a received image (e.g., satellite EO image) to produce a haze optimized image. According to an embodiment, image dehazing may comprise one or more of the following steps: haze removal, estimation of haze parameters, transmission map estimation, image enhancement, and post-processing. According to an embodiment, a dehazing algorithm analyzes the input image to identify regions affected by haze. These regions may be characterized by a reduction in contrast, a loss of color saturation, and bluish or grayish tint. The dehazing algorithm can estimate the parameters of the haze or atmospheric scattering model. This model describes how light is attenuated as it travels through the hazy atmosphere. The key parameters often include the global atmospheric light and the transmission map, which represents how much light has been scattered or absorbed along each pixel's path. The transmission map is important for dehazing. It is used to model the attenuation of light due to haze in the scene. Higher values in the transmission map indicate clearer regions with less haze, while lower values indicate hazier regions. Estimating this map accurately is a critical step. Once the haze parameters and transmission map are estimated, the algorithm uses them to perform image enhancement. This may involve attenuating the haze effect by adjusting pixel values based on the transmission map. The enhancement process increases contrast, restores color saturation, and improves overall image quality. In some implementations, after dehazing, post-processing techniques can be applied to further enhance the quality of the dehazed image. These may include denoising, color correction, and sharpening. The output of dehazing module 202 may be a haze optimized image.

In an embodiment, dehazing module 202 implements a Generative Adversarial Network (GAN) model to reduce or remove the impacts of haze from images. This technique has shown to improve imagery and CV algorithm quality.

A resolution module 204 is present and configured to perform image resolution enhancement on a received image (e.g., satellite EO image). In some embodiments, resolution module 204 receives as input an image that was previously processed by dehazing module 202. According to an embodiment, a technique called image super-resolution is used as a step when performing image enhancement. Image super-resolution is a technique used in image processing and computer vision to increase the resolution in a low-resolution image, thereby generating a higher-resolution version of the same image. This is particularly useful in applications where higher-resolution images are needed but only lower-resolution versions are available, such as in medical imaging, surveillance, satellite imagery, and digital photography. In an embodiment, resolution module 204 performs super-resolution on mid-resolution satellite EO imagery data.

According to an embodiment, the resolution enhancement process may utilize learning-based methods that use machine/deep learning techniques to learn the mapping between low-resolution and high-resolution images from a large dataset of paired images. Once the network is trained, it can be used to upscale new low-resolutions. In learning-based methods, deep neural networks may analyze the features and patterns in the low-resolution image to predict the corresponding high-resolution features.

In other implementations, the resolution enhancement process may utilize conventional reconstruction methods. These methods use various mathematical and signal processing techniques to estimate high-resolution details based on the low-resolution input. Common approaches include interpolation, edge extrapolation, and iterative algorithms.

The image may then be upscaled using the learned or estimated information to generate a higher-resolution version. The upscaling process aims to add details that were missing in the original low-resolution image. After upscaling, post-processing techniques may be applied to further refine the high-resolution image. This can include denoising, sharpening, and color correction.

A georegistration module 206 is present and configured to ensure every image is correctly aligned with same datum at each location. According to an embodiment, georegistration module 206 registers satellite imagery to the same foundational imagery base and delivers accurately aligned images (e.g., "National Geospatial-Intelligence Agency Image, Quality, and Utility"-validated high-resolution imagery) while removing time-consuming manual corrections. The result of the geolocation enhancement is an image, and subsequent object detections and feature extraction, with better than 5-meter circular error at 90% confidence.

The primary goal of georegistration is to align the image with the Earth's surface in such a way that each pixel in the image corresponds to a specific geographic coordinate. This ensures that features in the image are accurately positioned relative to the real world. Georegistration typically involves applying a coordinate transformation to the image. This transformation accounts for factors such as rotation, scale, translation (shifting), and distortion, which may be present due to the imaging process or the sensor's characteristics. To perform georegistration, module 206 may require geodetic data or ground control points (GCPs). GCPs are known locations on the Earth's surface with precisely known geographic coordinates. There are several sources of GCPs which may be used in to obtain geodetic data such as, for example, surveying and global positioning system (GPS) data, government agencies (e.g., National Geodetic Survey, National Spatial Reference System), commercial providers, open data initiatives (e.g., European Space Agency Geohazards Exploitation Platform), and/or the like. By matching features in the image to these GCPs, the software or algorithm can calculate the transformation needed to align the image accurately. During the georegistration process, the image may be warped or resampled to match the desired geographic coordinate system. This may involve interpolating pixel values to create a smoothly transformed image. Georegistration can include specifying the map projection and coordinate system to which the image should be registered. Different applications (e.g., embodiments) may require different projections, depending on factors like map scale, distortion characteristics, and the specific needs of the analysis.

Figure 3:
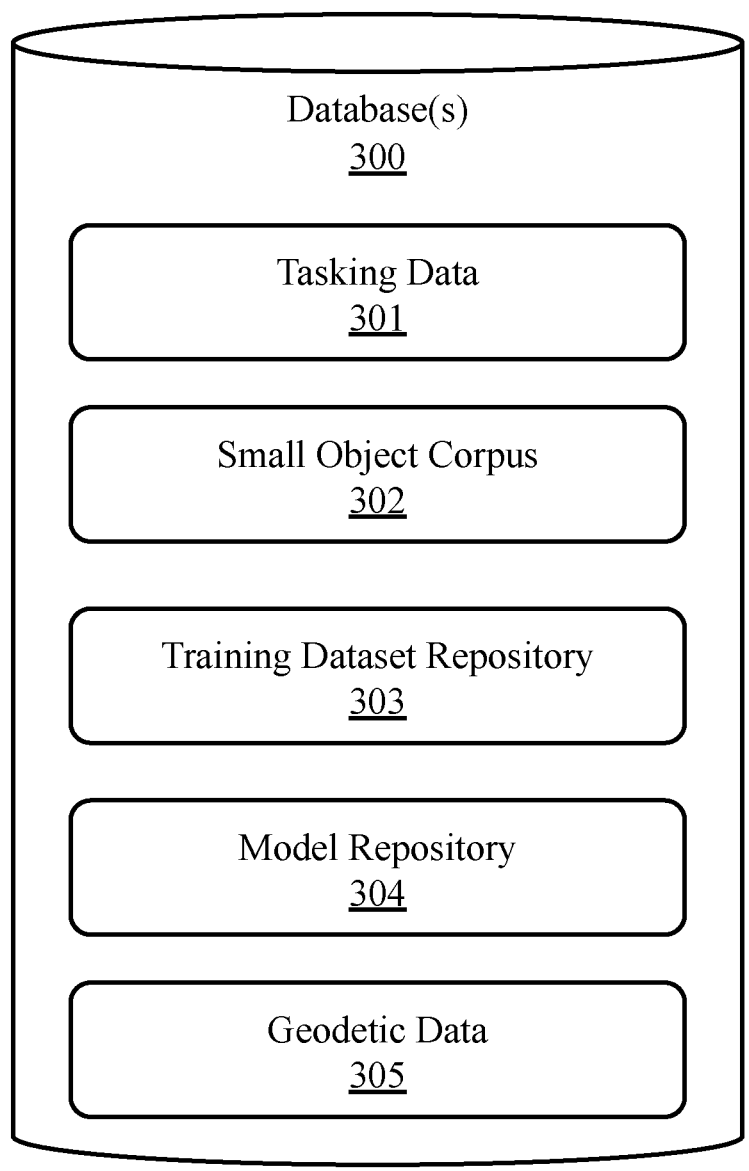
FIG. 3 is a block diagram illustrating an exemplary data storage system and the various types of information and data that may be stored therein, according to an embodiment.

FIG. 3 is a block diagram illustrating an exemplary data storage system and the various types of information and data that may be stored therein, according to an embodiment. Database(s) 300 may be configured according to one or more data storage and management architecture such as, for example, data warehouses and/or data lakes. Database(s) 300 serve as repositories for storing, organizing, and processing large volumes of data. Database(s) may comprise both (or one of) structured and unstructured data storage schemes, in a complementary manner, and as a result, store both structured and unstructured data. Database(s) may be stored in the memory of a computing device, or across multiple memory systems on multiple computing devices (e.g., at a datacenter). Database(s) may 300 be stored on a non-volatile data storage device of a computing device, or across multiple storage devices on multiple computing devices.

Database(s) 300 comprises various types of data used for a variety of purposes including image processing, object monitoring/detection/segmentation, and model training, to name a few. According to the embodiment, database(s) 300 comprises tasking data 301 and a small object corpus 302. High-resolution imagery tasking data may refer to the information and instructions provided to a satellite or imaging system to capture specific high-resolution images of a particular area or target (i.e., site) on the Earth's surface. This process involves tasking the satellite to collect detailed imagery of a specific location or object of interest. Tasking a satellite means issuing a set of directives or commands to the satellite to capture images of a specific area or target. Tasking can include specifying the geographic coordinates, date, time, and any special requirements for image capture. This can include information related to how the imaging process should be carried out. It may involve details such as the desired image resolution, the imaging mode (e.g., panchromatic, multispectral), and any additional parameters needed to obtain the desired imagery. Depending on the application (e.g., embodiment), there may be special requirements, such as avoiding cloud cover or capturing images at a specific angle or orientation.

Tasking data 301 may comprise high-resolution imagery for sites with ground and/or rail vehicle observations. Ground/rail vehicles are generally smaller and more densely positioned than aircraft and vessels; therefore, best practice is to observer ground/rail vehicles daily with mid-resolution imagery to visualize change, such as vehicles which have moved, and with high-resolution imagery tasked a few times per week (e.g., three) to ensure detections meet performance requirements. Tasking data 301 may be used for model training purposes by inference engine 140.

Small object corpus 302 may comprise a curated repository of additional samples of training data for objects in 0.3-meter to 3-meter GSD imagery, according to an embodiment. The inventors have curated in an-house corpus of more than 15,000 additional samples including objects in imagery produced by Maxar, Planet SkySat, and PlanetScope and covers an additional 15 classes of relocatable targets in addition to the xView ontology. The information stored in small object corpus 302 may be used for model training purposes by inference engine 140.

Database(s) 300 may further comprise a training dataset repository 303 comprising a plurality of training data and/or datasets which may be used by inference engine 140 when developing various AI/ML models implemented in various embodiments of platform 100. Training data 303 may comprise subsets of training data including, training, validation, and testing subsets. This ensures that the AI/ML models are trained on one set of data, validated on another, and tested on a separate set to assess its performance. Training dataset repository 303 may contain a collection of structured data that serves as the foundation for training and validating machine learning algorithms. Training data comprises a diverse set of data samples that are representative of the problem the AI/ML model is designed to solve. Thus, training dataset 303 can comprise a plurality of mid- and high-resolution imagery data, which may be sourced from satellites, and which may also comprise electro-optical imagery data. Additionally, training dataset 303 may comprise a plurality of classes associated with various objects of interest. In an embodiment, the classes may be associated with a plurality of automobiles (e.g., "tank", "bus", etc.), vessels (e.g., "cargo ship", "oil tanker", etc.) or aircraft (e.g., "bomber", "fighter", etc.), or some combination thereof. In some implementations, the plurality of classes may be stored and designed as an ontology. In an implementation, the ontology may be stored separately from training data repository 303. The information stored in training dataset repository 303 may be used for model training purposes by inference engine 140.

Training data 303 may further comprise annotated data, according to an embodiment. Subject matter experts may be tasked with validating detections output by inference engine 140. These annotated and validated detections can then be fed back into the modeling process to continue to iteratively refine the model.

Training data 303 may further comprise metadata about the data samples, including timestamps, source, quality, and any other relevant metadata. Metadata can help with data management, tracking, and ensuring quality. Data augmentation information may also be stored in training data repository 303. For image data, augmentation techniques applied to increase the dataset size (e.g., rotating images) are documented. This helps improve model robustness.

The models trained and deployed by platform 100 may be stored in model repository 304. Model repository 304 may comprise deployed production models 142, 144 as well as previous version of models, and versions of models currently under development.

Database(s) 300 may also store a plurality of geodetic data 305 which may be leveraged for image georegistration tasks. Geodetic data may comprise a set of measurements and information related to the shape, size, position, and gravity filed of the Earth. Geodetic data enables precise location determination, mapping, navigation, monitoring of targets (e.g., location and/or object).

Figure 4:
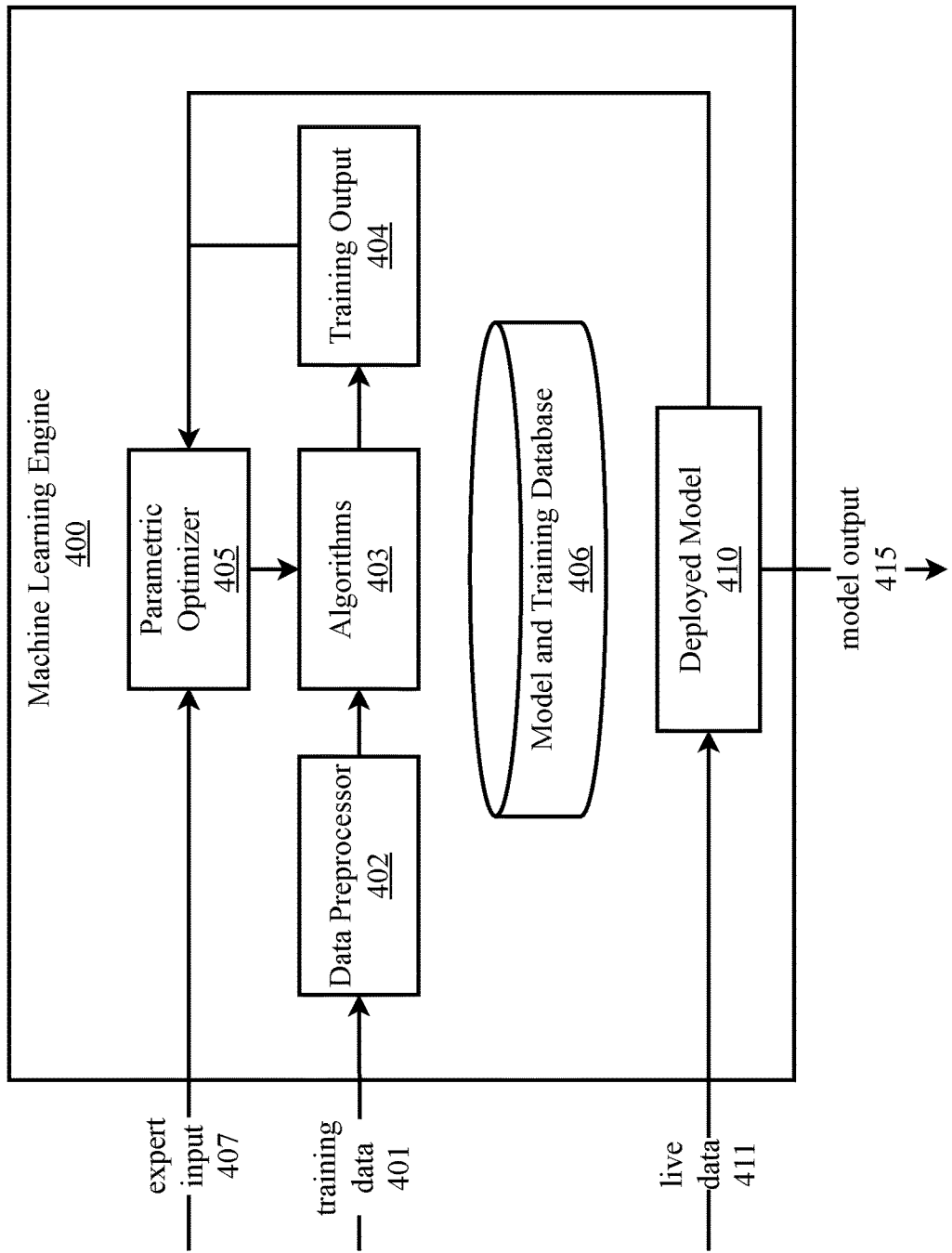
FIG. 4 is a block diagram illustrating an exemplary aspect of object monitoring platform, the machine learning engine.

FIG. 4 is a block diagram illustrating an exemplary aspect of object monitoring platform 100, the machine learning engine 400. According to the embodiment, machine learning engine may comprise a model training stage comprising a data preprocessor 402, one or more machine and/or deep learning algorithms 403, training output 404, and a parametric optimizer 405, and a model deployment stage comprising a deployed and fully trained model 410 configured to make predictions on live data 411. ML engine 400 may be used to train and deploy CV algorithms 142 and other AI/ML algorithms 144 in order to support the object monitoring and detection capabilities of platform 100.

At the model training stage, a plurality of training data 401 may be received at machine learning engine 400. In some embodiments, the plurality of training data may be obtained from one or more database(s) 300 and/or directly from various information sources via data ingestor 120 and/or API manager 130. In a use case directed to object monitoring and detection, a plurality of training data may be sourced from mid-resolution satellite EO imagery databases. Data preprocessor 402 may receive the input data and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 402 may also be configured to create training dataset and a test set from the plurality of input data 401. For example, a training dataset may comprise 85% of the preprocessed input data and the test dataset may comprise the remaining 15% of the data. The preprocessed training dataset may be fed as input into one or more machine and/or deep learning algorithms 403 to train a predictive model for object monitoring and detection.

During model training, training output 404 is produced and used to measure the accuracy and usefulness of the predictive outputs. During this process a parametric optimizer 405 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

According to an embodiment, the training output detections 404 produced by the model are validated by subject matter experts. The expert's annotations 407 may then be used to in the next round of model training, improving the process and increasing model performance. This is essential in ensuring the models perform well across various geographies and significantly reduces overhead from a modeling standpoint. This approach also streamlines analyst validation timelines and increases subsequent analytic reliability due to reduced false positive detections, higher detection confidence, and more accurate object detection or image segmentation results.

The test dataset can be used to test the accuracy of the model outputs. If the training model is making predictions that satisfy a certain criterion (e.g., baseline behavior, etc.), then it can be moved to the model deployment stage as a fully trained and deployed model 410 in a production environment making predictions based on live input data 411 (e.g., real-time satellite EO imagery data). The deployed model can output an enhanced image 415 comprising an upscaled image and indications of the types of objects located within the image, if any. Further, model predictions made by deployed model can be used as feedback and applied to model training in the training stage, wherein the model is continuously learning over time using both training data and live data and predictions.

A model and training database 406 is present and configured to store training/test datasets and developed models. Database 406 may also store previous versions of models. Database 406 may be a part of database(s) 300.

According to some embodiments, the one or more machine and/or deep learning models may comprise any suitable algorithm known to those with skill in the art including, but not limited to: supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 403 may comprise a deep learning algorithm such as neural networks (e.g., recurrent, convolutional, long short-term memory networks, etc.).

According to some embodiments, the AI/ML baseline models may be trained using training data from proven geospatial datasets such as xView. xView is a high-resolution geospatial computer vision dataset created by NGA/R and Defense Innovation Unit, which contains training data for over 270,000 relocatable targets across more than 40 classes. The platform can source imagery from various target geographies and seasons to ensure the models perform well year-round and across various geographies, which may be nonhomogeneous, in different biomes, or impacted by distinct seasonality and climate conditions. Additionally, platform 100 can utilize an advanced suite of dataset augmentations that increases the quality and quantity of training data, allowing the models to be more robust for recognizing targets from different views or under different imaging conditions. Data augmentation techniques may include haze reduction and image resolution enhancement techniques, which is also implemented during image inference (via image processing engine 200) to ensure optimal image quality for detection.

In some implementations, a convolutional neural network (CNN) may be trained using preprocessed training data comprising at least in part, mid-resolution satellite EO imagery data (e.g., xView dataset, small image corpus 302, etc.). In such implementations, the CNN may consist of multiple layers of nodes: the input layer, the hidden layer, and the output layer. The CNN begins with a series of convolutional layers. These layers apply a set of learnable filters (also known as kernels) to the input image. Each filter slides or "convolves" across the image, performing element-wise multiplication and summation operations to produce a feature map. Convolutional layers capture local patterns and features. After each convolution operation, an activation function (e.g., Rectified Linear Unit) is applied element-wise to introduce non-linearity to the model. This helps the network learn complex patterns. In some implementations, pooling layers downsample the feature maps produced by convolutional layers. Max-pooling is a common technique that selects the maximum value in a local region (pooling window) of the feature map. Pooling reduces spatial dimensions, helping to reduce computational complexity and make the network more robust to small spatial variations. After several convolutional and pooling layers, the feature maps are flattened into a one-dimensional vector. This flattening operation prepares the data for input to fully connected (FC) layers. These layers are traditional neural network layers where each neuron is connected to every neuron in the previous and subsequent layers. FC layers learn to combine features from different parts of the input and make final predictions. For classification tasks, the last FC layer typically has as many neurons as there are classes, and softmax activation is applied to produce class probabilities. The final layer produces the network's output, which depends on the task. For classification, it produces class probabilities. For object detection, it produces bounding box coordinates and class labels. For image segmentation, it produces a prediction mask with each pixel containing a class label and polygon overlay extracted from the prediction mask. In an embodiment, CV 142 and AI/ML models 144 may comprise a classification model, an object detection model, a segmentation model, or all three. In such an embodiment, inference engine 140 may output an enhanced image comprising one or more class labels and one or more bounding boxes.

Figure 5:
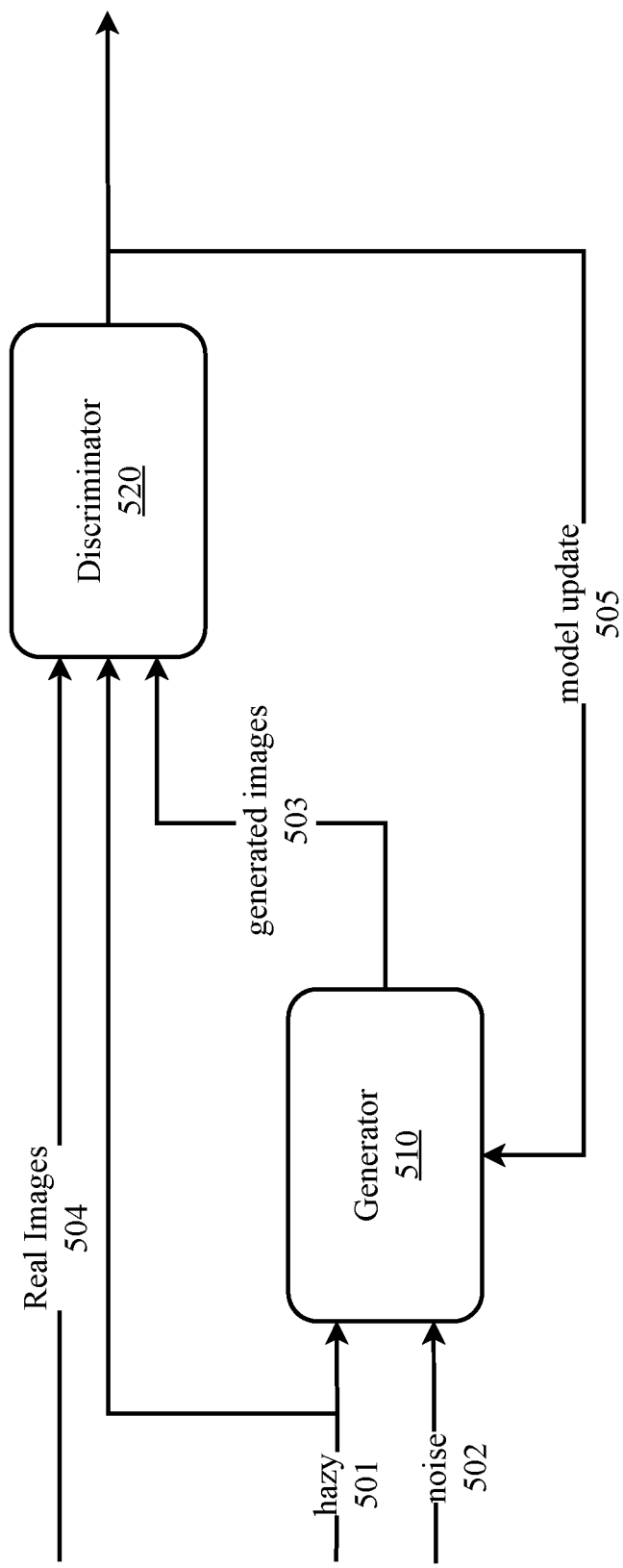
FIG. 5 is a block diagram illustrating an exemplary generative adversarial network configured for image dehazing, according to an embodiment.

In some implementations, algorithms 403 may comprise a generative adversarial network (GAN) model trained using preprocessed training data comprising at least in part, mid-resolution satellite EO imagery data (e.g., xView dataset, small image corpus 302, etc.). The GAN may be configured to provide haze reduction capabilities on obtained images as part of a multi-step process for generating ARD. Referring now to FIG. 5, which is a block diagram illustrating an exemplary GAN network for image dehazing, according to an embodiment. To train the GAN, a dataset of hazy images and their corresponding clear (non-hazy) counterparts is obtained. In an embodiment, the GAN is a conditional GAN (cGAN), where a generator 510 takes both the hazy image 501 and a noise vector 502 as input to produce a dehazed image. The random noise vector is added to the hazy image to introduce stochasticity and diversity in the generated results. Using cGAN, the generator and discriminator 520 are conditioned during the training process with a hazy image 501. Both generator and discriminator are fed a class label and conditioned on it. The generator 510 is parameterized to learn and produce realistic samples for each hazy image in the training dataset. By processing the conditioning information (hazy image) along with the noise vector, the generator learns to produce de-hazed images that match the conditional information while adding the necessary details to remove the haze. The generator network in the GAN learns to map from a hazy image to a de-hazed image. It can consist of convolutional layers, followed by upsampling layers, which progressively increase the spatial resolution of the generated image.

The discriminator 520 learns to distinguish fake and real samples, given the hazy image information. The discriminator network is trained to distinguish between real (clear) and generated (de-hazed) images. It helps guide the generator to produce more realistic and haze-free images. The discriminator's task is to assess how well the generated de-hazed image 503 matches the true clear image 504 given the hazy input 501. The output 505 of the discriminator 520 may be used to update the generator model.

The GAN may employ two or more main loss functions. In an implementations, an adversarial loss is computed. This loss measures how well the generator can deceive the discriminator. It encourages the generator to produce de-hazed images that are indistinguishable from real clear images when conditioned on the hazy input. Another loss that might be utilized is perceptual loss. This loss is based on a perceptual similarity metric, often computed using a pre-trained deep neural network. It measures the similarity between the generated de-hazed image and the true clear image. The perceptual loss encourages the generator to produce de-hazed images that are visually similar to clear images. During training, the cGAN aims to minimize both the adversarial loss and the perceptual loss. The generator 510 is updated to produce de-hazed images that deceive the discriminator and are perceptually like clear images. The discriminator 520 is updated to become better at distinguishing between real and generated images when conditioned on hazy inputs.

Referring again to FIG. 4, in some implementations, ML engine 400 automatically generates standardized model scorecards for each model produced to provide rapid insights into the model and training data, maintain model provenance, and track performance over time. These model scorecards provide insights into model framework(s) used, image sensor/phenomenology, training data AOI, types of objects and counts, training data specifications such as chip size, stride, data splits, baseline hyperparameters, and other factors. Model scorecards may be stored in database(s) 300.

Detailed Description of Exemplary Aspects

It should be appreciated that steps of various methods shown herein may not necessarily be executed in the order in which they are described, and in some cases some steps may be executed simultaneously (e.g., such as using parallel processing). It should be further appreciated that each of these steps may not need to be executed in order for platform 100 to provide object monitoring, detection, and segmentation capabilities, and that more or fewer steps may be used to provide object monitoring, detection, and segmentation as described herein. For example, some implementations may combine the processes of two or more steps into a singular step, or some steps may not be executed, dependent upon the embodiment and use case requirements.

Figure 6:
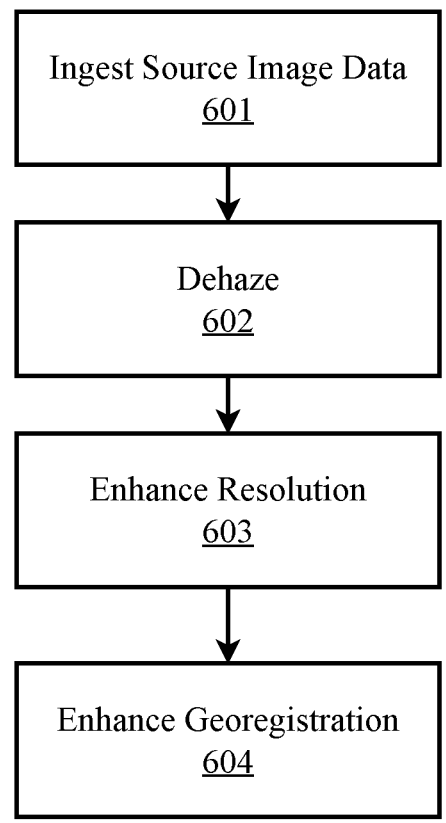
FIG. 6 is a flow diagram illustrating an exemplary method for producing analysis ready data (ARD), according to an embodiment.

FIG. 6 is a flow diagram illustrating an exemplary method 600 for producing analysis ready data (ARD), according to an embodiment. According to an embodiment, the process begins at step 601 when platform 100 ingests source image data. The source image data may comprise mid-resolution EO imagery data obtained from one or more satellites. In an embodiment, platform 100 may utilize tasking data 301 to instruct one or more satellites on acquiring the source image data. The ingested source image data may be sent to image processing engine 200 wherein a dehazing module 202 can receive the image and apply image dehazing techniques to the image to produce a haze optimized image at step 602. At step 603, the haze optimized image may be sent to resolution module 204 which performs image enhancement (e.g., super-resolution) on the image. As a last step 604, the output of resolution module 204 is send to georegistration module 206 which performs georegistration on the image by performing geospatial alignment. The result of this process is a mid-resolution image that has been enhanced and is ready to be used as input into inference engine 140 which can monitor and detect objects in the processed source image.

Figure 7:
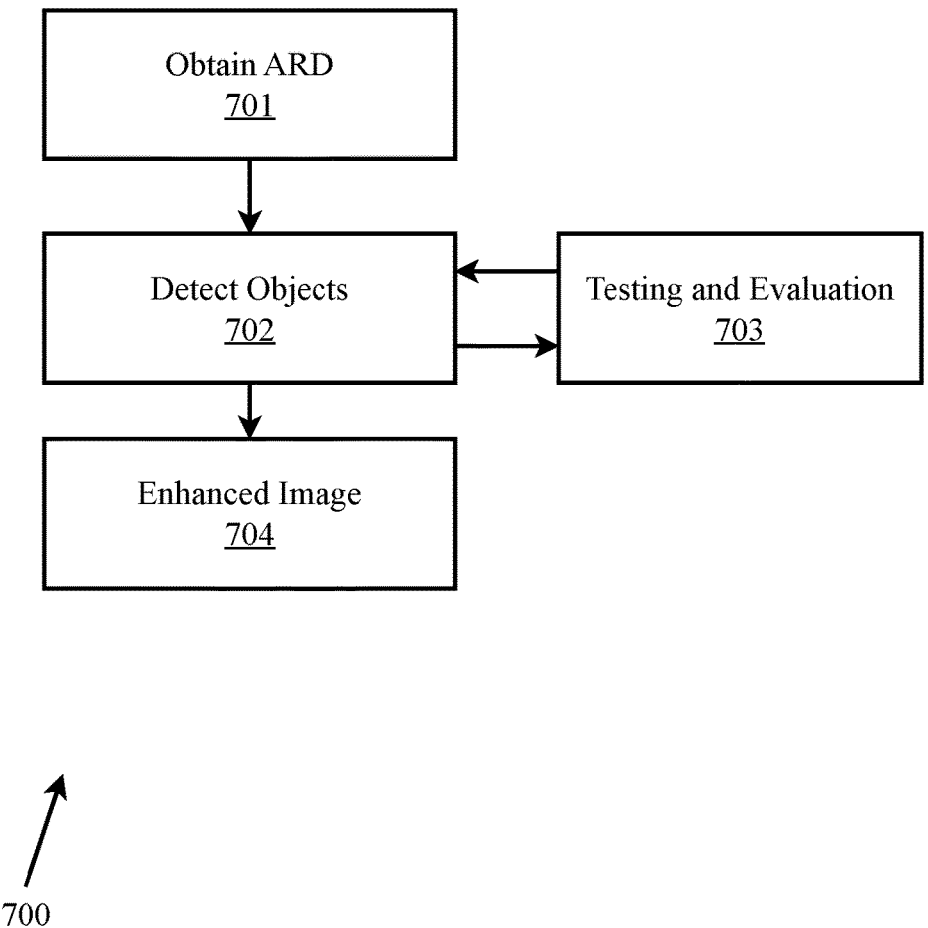
FIG. 7 is a flow diagram illustrating an exemplary method for object monitoring and detection, according to an embodiment.

FIG. 7 is a flow diagram illustrating an exemplary method 700 for object monitoring, detection, and segmentation, according to an embodiment. According to the embodiment, the process begins at step 701 when inference engine 140 receives, retrieves, or otherwise obtains ARD or a processed source image. The ARD may be obtained from the output of image processing engine 200. Inference engine 140 may utilize various AI/ML algorithms 144 including computer vision 142 to detect objects in the processed source image at step 702. Object detection and image segmentation may be performed using one or more of the models described herein. For example, a trained CNN may be used to process the ARD data to detect an object and produce as output an enhanced image, wherein the enhanced image comprises a visually enhanced image (e.g., upscaled) comprising one or more boundary boxes and for each boundary box a classification label associated with an automobile, vessel, aircraft, road, building and/or the like. Step 703 indicates that testing and evaluation of the object monitoring and detection models is always being conducted using the detected outputs from the model to test and validate model performance. As a last step, 704 inference engine 140 may produce as output an enhanced image which can be stored in database(s) 300, or viewed directly via UI 110.

Exemplary Computing Environment

Figure 8:
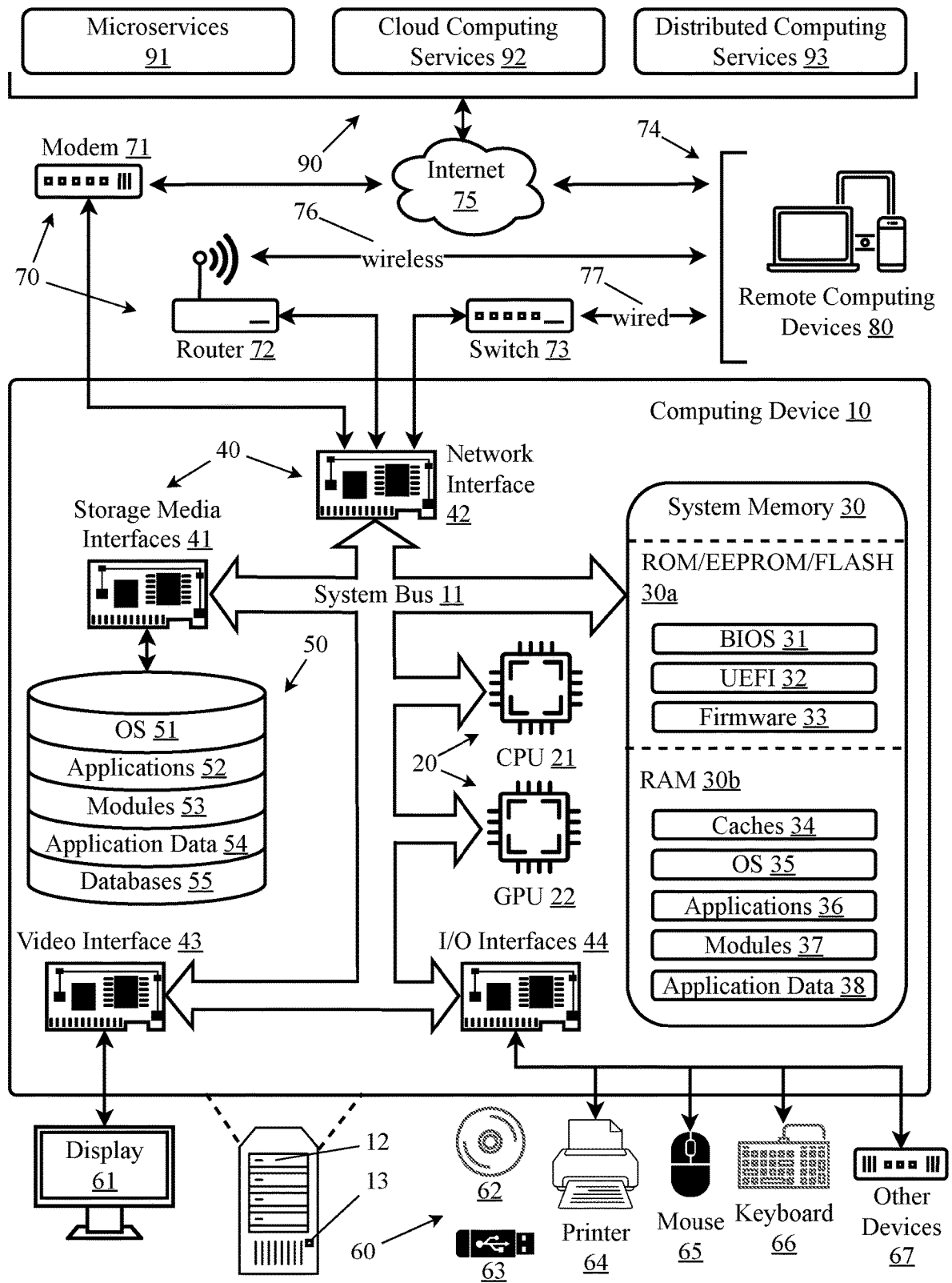
FIG. 8 illustrates an exemplary computing environment on which an embodiment described herein may be implemented.

FIG. 8 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92.

Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. An object monitoring, detection, and segmentation platform, comprising:
   a computing device comprising a memory and a processor;
   a machine learning algorithm configured to perform object detection or image segmentation on an input in order to generate as output an enhanced image;
   an image processing engine comprising a first plurality of programming instructions stored in the memory which, when operating on the processor, causes the computing device to:
   receive satellite imagery data;
   produce analysis ready data (ARD) by:
   performing image dehazing on the satellite imagery data;
   performing resolution enhancement on the satellite imagery data; and
   performing geospatial alignment on the satellite imagery data; and an inference engine comprising a second plurality of programming instructions stored in the memory which, when operating on the processor, causes the computing device to:
use the ARD as an input to the machine learning algorithm to produce an enhanced image associated with the satellite imagery data.

2. The platform of claim 1, wherein the satellite imagery data comprises mid-resolution images.

3. The platform of claim 1, wherein the satellite imagery is electro-optical imagery.

4. The platform of claim 1, wherein the image dehazing is performed using a dehazing model.

5. The platform of claim 4, wherein the dehazing model is developed using a generative adversarial network.

6. The platform of claim 1, wherein the resolution enhancement is performed using a super-resolution technique.

7. The platform of claim 1, wherein the machine learning algorithm is a computer vision algorithm.

8. The platform of claim 1, wherein the machine learning algorithm is a convolutional neural network.

9. The platform of claim 1, wherein the enhanced image comprises one or more bounding boxes and one or more class labels.

10. The platform of claim 1, wherein the satellite imagery data comprises high-resolution images.

11. A method for object monitoring, detection, and segmentation, comprising the steps of:
training a machine learning algorithm configured to perform object detection or image segmentation on an input in order to generate as output an enhanced image;
receiving satellite imagery data;
producing analysis ready data (ARD) by:
performing image dehazing on the satellite imagery data;
performing resolution enhancement on the satellite imagery data; and
performing geospatial alignment on the satellite imagery data; and
using the ARD as an input to the machine learning algorithm to produce an enhanced image associated with the satellite imagery data.

12. The method of claim 11, wherein the satellite imagery data comprises mid-resolution images.

13. The method of claim 11, wherein the satellite imagery is electro-optical imagery.

14. The platform of claim 11, wherein the image dehazing is performed using a dehazing model.

15. The method of claim 14, wherein the dehazing model is developed using a generative adversarial network.

16. The method of claim 11, wherein the resolution enhancement is performed using a super-resolution technique.

17. The method of claim 11, wherein the machine learning algorithm is a computer vision algorithm.

18. The method of claim 11, wherein the machine learning algorithm is a convolutional neural network.

19. The method of claim 11, wherein the enhanced image comprises one or more bounding boxes and one or more class labels.

20. The method of claim 11, wherein the satellite imagery data comprises high-resolution images.

* * * * *